United States Patent Office 2,915,544
Patented Dec. 1, 1959

2,915,544
FLUOROALKYLSILANE DIOLS

George W. Holbrook, Midland, and Paul L. Brown, Saginaw, Mich., assignors to Dow Corning Corporation, Midland, Mich., a corporation of Michigan No Drawing. Application December 11, 1957
Serial No. 701,989

5 Claims. (Cl. 260—448.2)

This application relates to low molecular weight fluoroalkylsilicon diols.

It is the object of this invention to prepare novel diols which are useful as intermediates in the preparation of polymeric siloxanes. Another object is to prepare materials which are useful for the purpose of preventing crepe aging in trifluoroalkylpolysiloxane gums which have been compounded with finely divided silicas. Other objects and advantages will be apparent from the following description.

This invention relates to compositions of matter having the formula

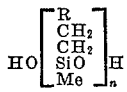

in which R is a perfluoroalkyl group of from 1 to 3 carbon atoms and $n$ is an integer from 1 to 4 inclusive.

The compositions of this invention are best prepared by the careful hydrolysis of the corresponding chlorosilanes of the formula

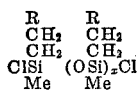

where $x$ has a value from 0 to 3 inclusive. This hydrolysis is best carried out by adding the chlorosilane to cold water containing a mild alkali such as ammonium hydroxide or sodium carbonate. In carrying out this reaction it is best to dilute the chlorosilane with a volatile solvent such as diethyl ether, toluene or methylene chloride. After hydrolysis the diols are washed to neutrality and then isolated by crystallization or distillation.

The chlorosilanes in which $x$ is 0 are best prepared in accordance with the method described in the copending application of Paul Tarrant, Serial No. 608,668, filed September 10, 1956, the disclosure of which is hereby incorporated in this application by reference.

Those chlorosilanes in which $x$ is 1 to 3 are best prepared by reacting the corresponding siloxane with aqueous hydrochloric acid under superatmospheric pressure. This method is more fully described in the copending application of Paul L. Brown, Serial No. 701,988, filed simultaneously herewith.

The compositions of this invention are particularly useful as additives for unvulcanized trifluoropropylmethylpolysiloxane gums containing reinforcing silica fillers (i.e. fume silicas and silica aerogels). The purpose of the diols of this invention is to prevent the premature hardening of the mixture of the filler and gum which is known as "crepe aging." This hardening interferes with subsequent fabrication of the rubber.

The following examples are illustrative only and should not be construed as limiting the invention which is properly delineated in the appended claims.

Example 1

31.3 g. of

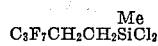

was diluted with 241 g. of diethyl ether. The solution was added slowly to an aqueous solution of 24 g. of 28% ammonium hydroxide diluted to 250 ml. with water. The mixture was stirred during the addition of the chlorosilane and the temperature of the reaction mixture was maintained at 0° C. Following hydrolysis the ether layer was separated, washed with water until neutral, and the solvent was evaporated at room temperature to give a soft, waxy solid. The product was recrystallized from ether to give a soft, white crystalline material having a melting point of from 25 to 27° C. This material was shown by hydroxyl analysis to be the diol of the formula $$\text{C}_3\text{F}_7\text{CH}_2\text{CH}_2\overset{\text{Me}}{\text{Si}}(\text{OH})_2$$

Example 2

105.5 g. of

was diluted with diethyl ether to give a 10% by weight solution of the chlorosilane. The resulting solution was added to a dilute aqueous solution of ammonium hydroxide with stirring at a temperature of 0° C. The ammonium hydroxide was present in amount slightly in excess of that required to neutralize the hydrochloric acid.

After hydrolysis the ether solution was washed neutral and evaporated to give a soft, crystalline material. The product was recrystallized from toluene and there was obtained a white, crystalline material melting at 82 to 85° C. which was shown by hydroxyl analysis to be the diol

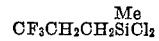

Example 3

Each of the diols shown below was prepared by hydrolyzing the chlorosiloxanes shown below in the following manner. The chlorosiloxanes were diluted with 1 volume of ether and then slowly added to ice water containing an excess of sodium carbonate over that required to neutralize with HCl. The hydrolyzate was then washed neutral with water and distilled to isolate the diol.

| Chlorosilane | Diol | Boiling Point | Viscosity at 25° C., cs. | $d$ at 25° C. | $n_D^{25}$ |
|---|---|---|---|---|---|
| CF₃ CF₃<br>CH₂ CH₂<br>CH₂ CH₂<br>ClSi OSiCl<br>Me Me | HO[CF₃<br>CH₂<br>CH₂<br>SiO<br>Me]₂H | 111–114° C. at 1.7 mm | 76.5 | 1.276 | 1.3771 |
| CF₃ CF₃<br>CH₂ CH₂<br>CH₂ CH₂<br>ClSi (OSi)₂Cl<br>Me Me | HO[CF₃<br>CH₂<br>CH₂<br>SiO<br>Me]₃H | 120–123° C. at 2 mm | 126 | 1.277 | 1.3764 |
| CF₃ CF₃<br>CH₂ CH₂<br>CH₂ CH₂<br>ClSi (OSi)₃Cl<br>Me Me | HO[CF₃<br>CH₂<br>CH₂<br>SiO<br>Me]₄H | 136–137° C. at .5 mm | 149 | 1.282 | 1.3768 |

That which is claimed is:

1. A composition of matter having the formula

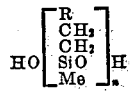

in which R is a perfluoroalkyl group of from 1 to 3 inclusive carbon atoms and $n$ is an integer from 1 to 4 inclusive.

2. A diol of the formula

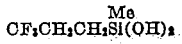

3. A diol of the formula

4. A diol of the formula

5. A diol of the formula

References Cited in the file of this patent

Pierce et al.: "Jour. Amer. Chem. Soc.," vol. 75 (November 1953), pp. 5618–20.

McBee et al.: Ibid., vol. 77 (March 1955), pp. 1292–3.

Tarrant: "Development of Fluoro-Silicone Elastomers," WADC Technical Report 55-220 (Wright Air Development Center, August 1955, pp. 12 and 37).